United States Patent
Takahashi et al.

(10) Patent No.: US 10,618,557 B2
(45) Date of Patent: Apr. 14, 2020

(54) VEHICLE BODY STRUCTURE

(71) Applicant: HONDA MOTOR CO., LTD., Tokyo (JP)

(72) Inventors: Koichi Takahashi, Wako (JP); Masaki Izutsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 86 days.

(21) Appl. No.: 15/979,992

(22) Filed: May 15, 2018

(65) Prior Publication Data

US 2018/0346031 A1 Dec. 6, 2018

(30) Foreign Application Priority Data

Jun. 2, 2017 (JP) .................................. 2017-110237

(51) Int. Cl.
| | |
|---|---|
| *B62D 21/11* | (2006.01) |
| *B60G 7/00* | (2006.01) |
| *B60N 2/005* | (2006.01) |
| *B62D 25/20* | (2006.01) |
| *B60G 7/02* | (2006.01) |

(52) U.S. Cl.
CPC .............. *B62D 21/11* (2013.01); *B60G 7/008* (2013.01); *B60G 7/02* (2013.01); *B60N 2/005* (2013.01); *B62D 25/20* (2013.01); *B60G 2200/14* (2013.01); *B60G 2204/143* (2013.01); *B60G 2204/1432* (2013.01); *B60G 2206/11* (2013.01)

(58) Field of Classification Search
CPC ........ B62D 21/11; B62D 25/20; B60G 7/008; B60G 2204/143; B60N 2/005

USPC .......................... 280/124.109, 788; 180/89.1
See application file for complete search history.

(56) References Cited

U.S. PATENT DOCUMENTS 7,841,649 B2 * 11/2010 Konishi ............. B62D 25/2027
296/193.02

FOREIGN PATENT DOCUMENTS

| JP | 60-038873 U | | 3/1985 |
|---|---|---|---|
| JP | 07-246956 A | | 9/1995 |
| JP | 07246956 A | * | 9/1995 |
| JP | 3785920 B | | 3/2006 |
| JP | 3785920 B2 | * | 6/2006 |
| JP | 2015-101233 A | | 6/2015 |

(Continued)

OTHER PUBLICATIONS

Japanese Office Action (w/ partial English translation) issued for Application No. 2017-110237 dated Oct. 22, 2018.

*Primary Examiner* — Paul N Dickson
*Assistant Examiner* — Hilary L Johns
(74) *Attorney, Agent, or Firm* — Thomas | Horstemeyer, LLP

(57) ABSTRACT

The present invention provides a vehicle body structure comprising a left suspension and a right suspension each including an arm member provided under a floor portion of a vehicle body; a left attachment portion configured to attach a vehicle body side end portion of the arm member of the left suspension to the floor portion; a right attachment portion configured to attach a vehicle body side end portion of the arm member of the right suspension to the floor portion; and a seat fixing portion configured to fix, to the floor portion, a seat provided on the floor portion, wherein the seat fixing portion is located between the left attachment portion and the right attachment portion in a vehicle width direction.

8 Claims, 6 Drawing Sheets

(56) References Cited

FOREIGN PATENT DOCUMENTS

JP    2015101233  A  *  6/2015

* cited by examiner

VEHICLE BODY STRUCTURE

BACKGROUND OF THE INVENTION

Field of the Invention

The present invention relates to a vehicle body structure.

Description of the Related Art

As an independent suspension in a car, there is known a trailing arm type suspension. Japanese Patent No. 3785920 discloses an arrangement of attaching, to the frame (suspension member) of a vehicle body, a bracket provided at one end of a Y-shaped trailing arm on the vehicle body center side.

As disclosed in Japanese Patent No. 3785920, in a structure in which the end portion of the arm member of a suspension is directly attached to the vehicle body, vibrations tend to be readily transferred from a wheel to the vehicle body via an attachment portion.

SUMMARY OF THE INVENTION

The present invention, for example, reduces the vibrations of a vehicle body.

According to one aspect of the present invention, there is provided a vehicle body structure comprising: a left suspension and a right suspension each including an arm member provided under a floor portion of a vehicle body; a left attachment portion configured to attach a vehicle body side end portion of the arm member of the left suspension to the floor portion; a right attachment portion configured to attach a vehicle body side end portion of the arm member of the right suspension to the floor portion; and a seat fixing portion configured to fix, to the floor portion, a seat provided on the floor portion, wherein the seat fixing portion is located between the left attachment portion and the right attachment portion in a vehicle width direction.

Further features of the present invention will become apparent from the following description of exemplary embodiments with reference to the attached drawings.

DESCRIPTION OF THE EMBODIMENTS

Figure 1:
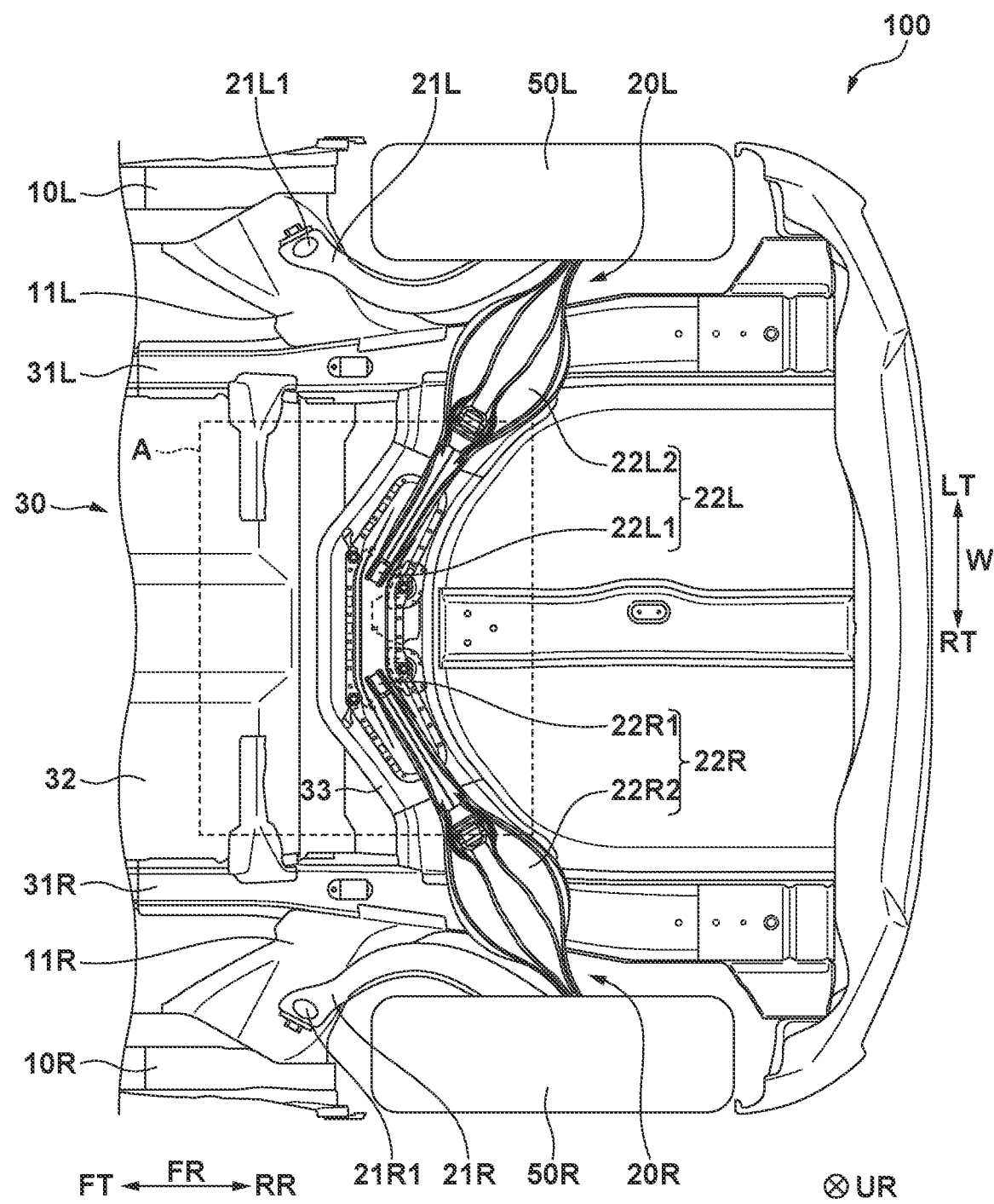
FIG. 1 is a view showing a vehicle body rear structure according to an embodiment of the present invention when viewed from below.

Exemplary embodiments of the present invention will be described below with reference to the accompanying drawings. Note that the same reference numerals denote the same members throughout the drawings, and a repetitive description thereof will not be given.

Figure 2:
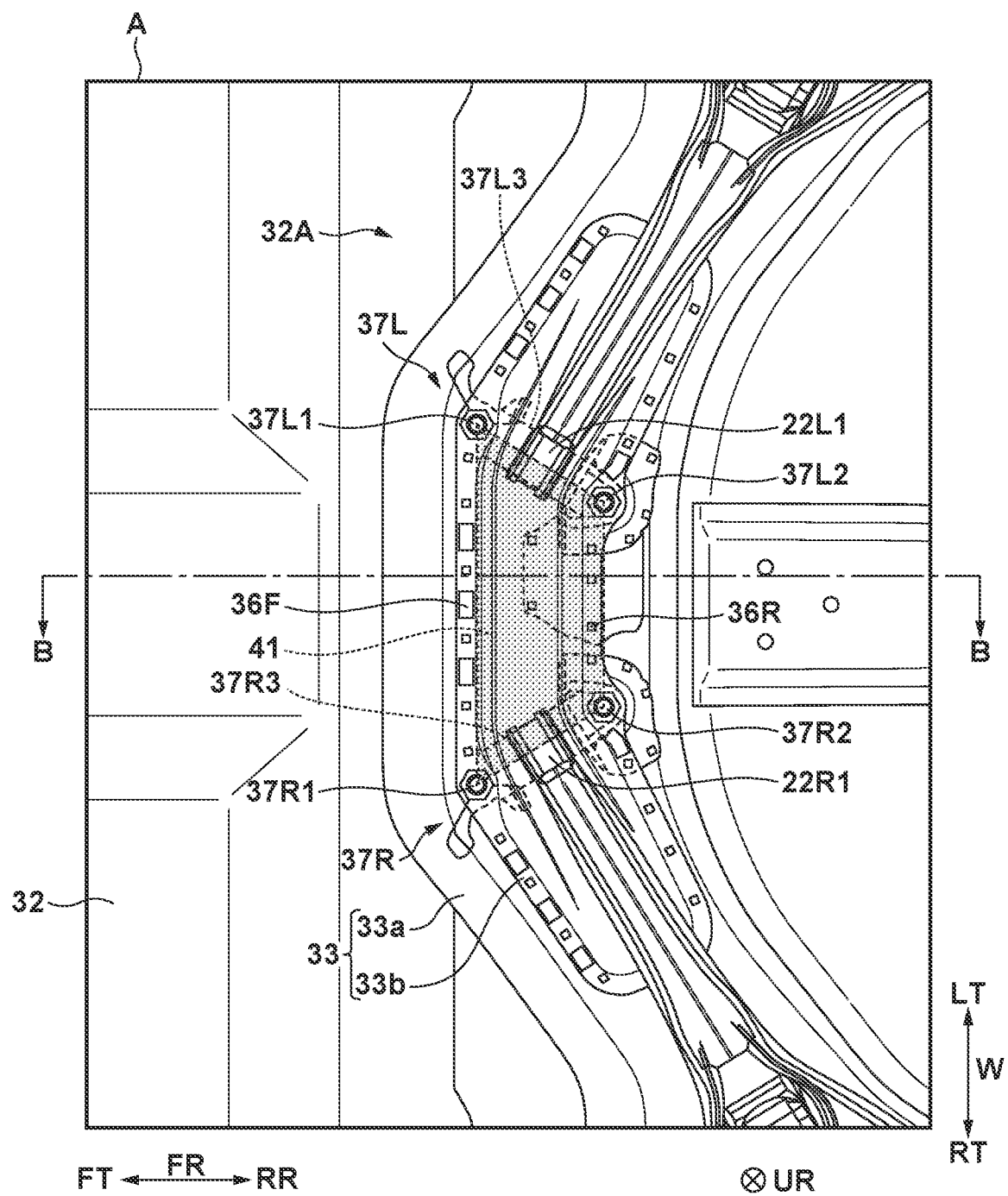
FIG. 2 is an enlarged view showing a region A in FIG. 1.
Figure 3:
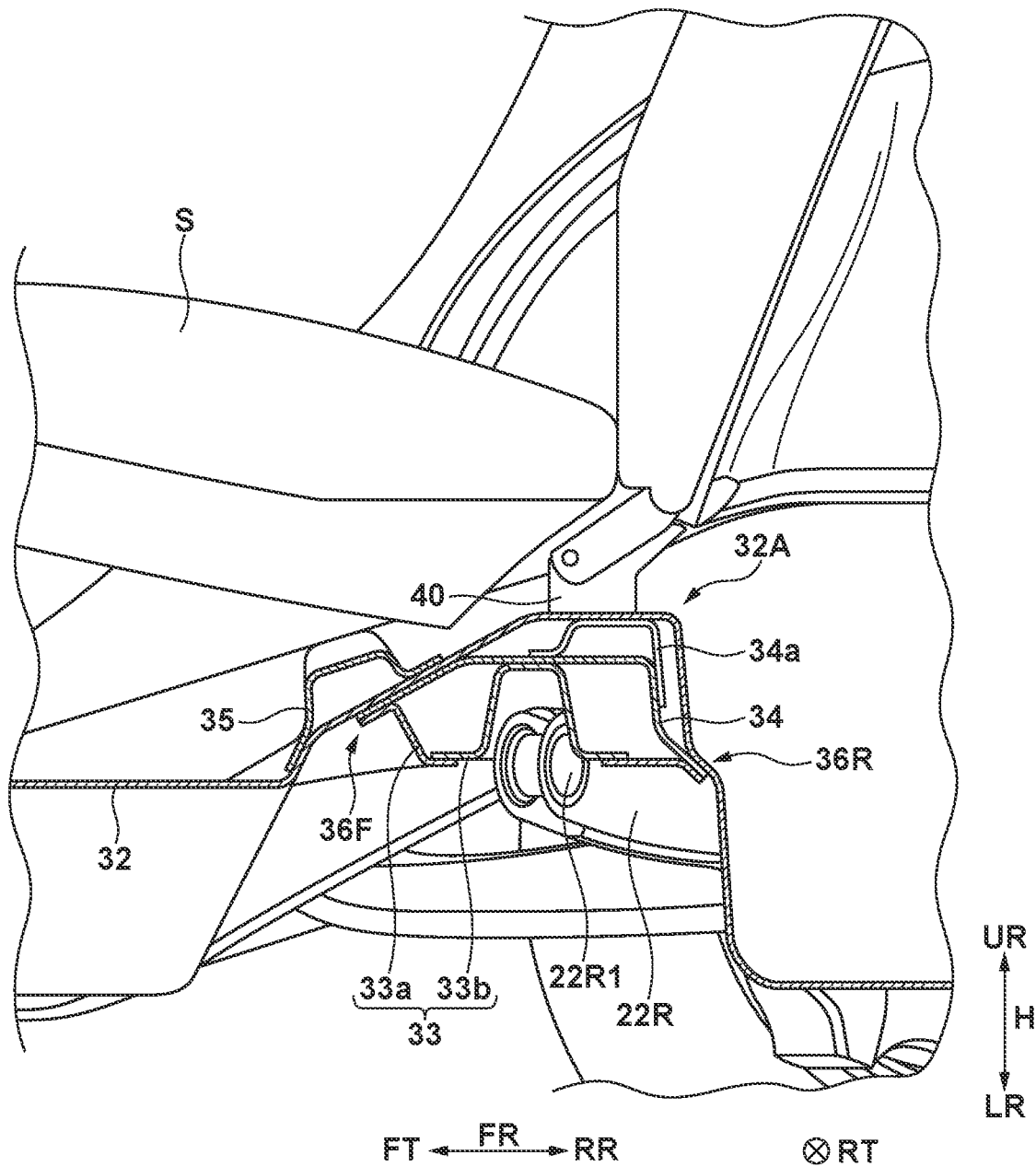
FIG. 3 is a sectional view taken along a line B-B in FIG. 2 and showing the vehicle body rear structure.
Figure 4:
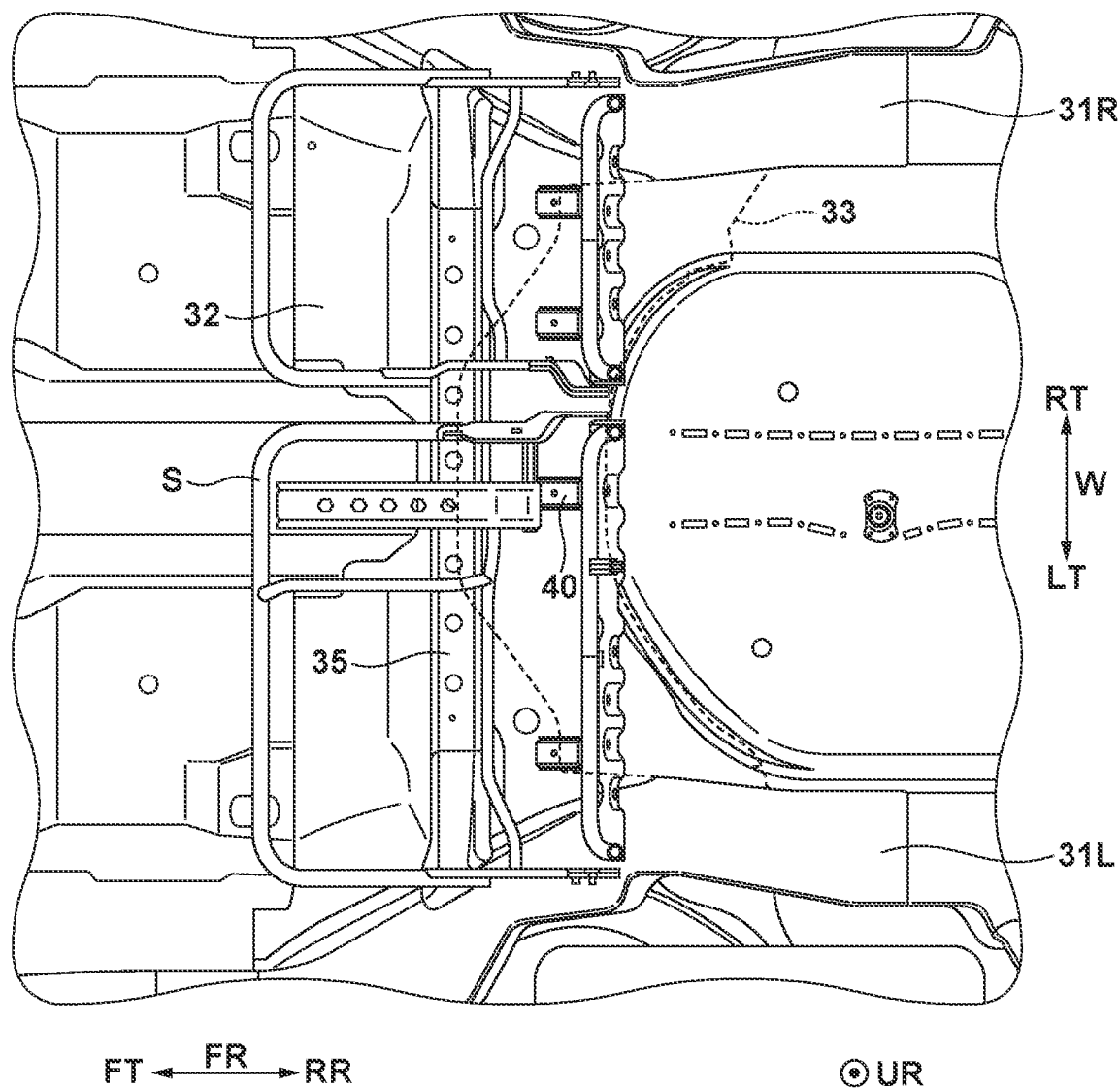
FIG. 4 is a view showing the vehicle body rear structure when viewed from above (the inside of the vehicle)
Figure 5:
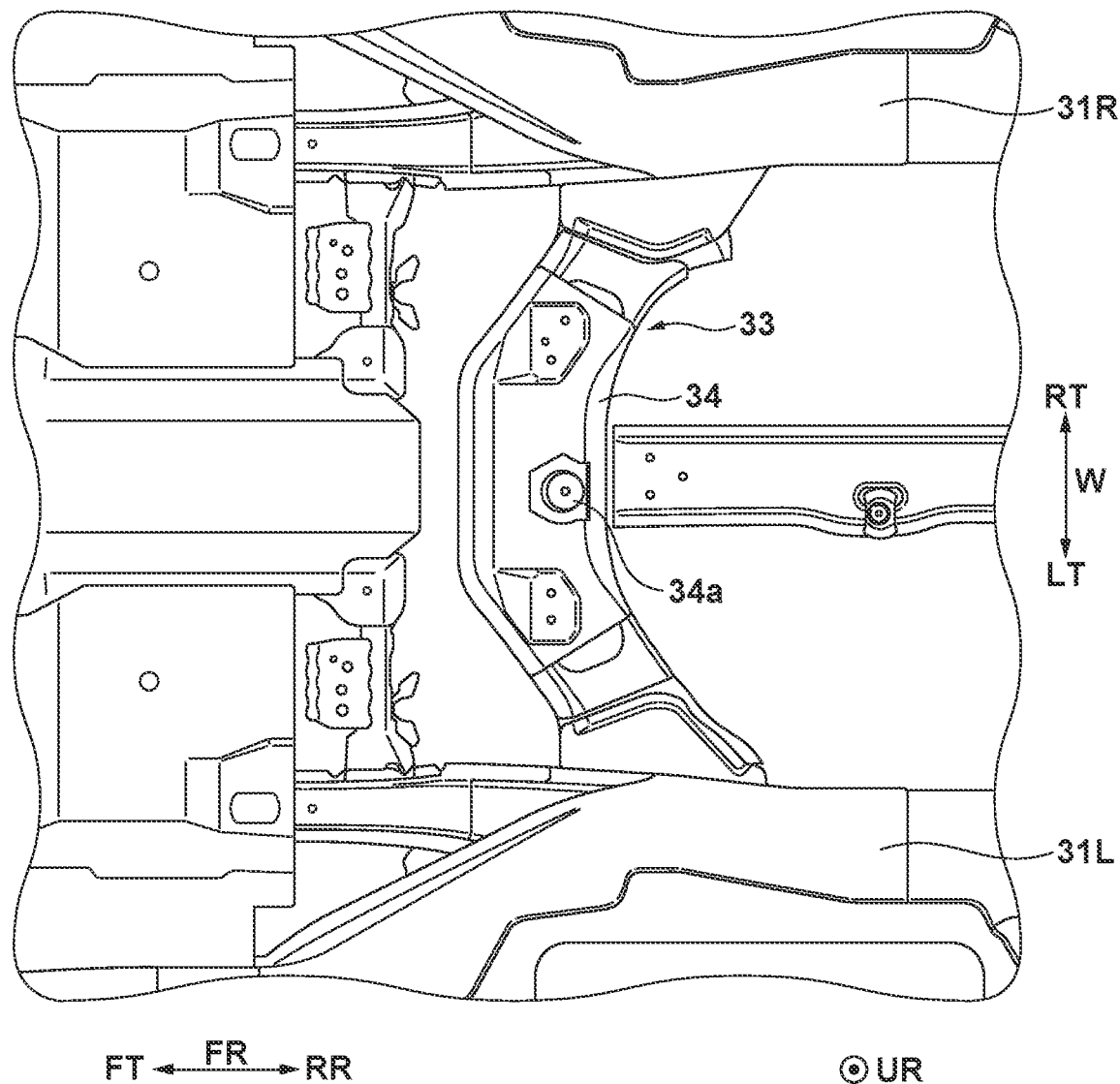
FIG. 5 is a view showing, when viewed from above (the inside of the vehicle), a state in which a floor panel is removed from the structure shown in FIG. 4.
Figure 6:
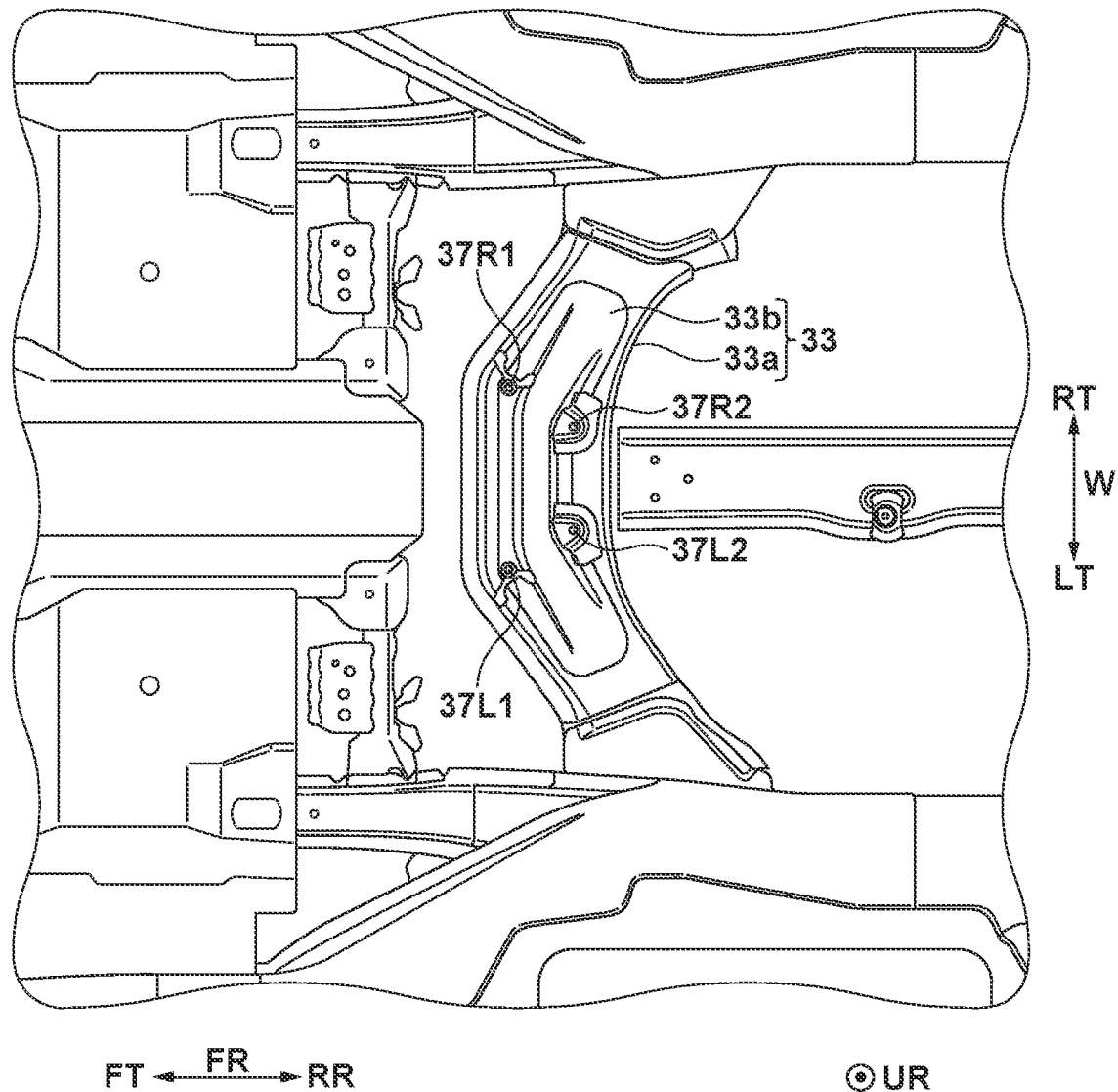
FIG. 6 is a view showing, when viewed from above (the inside of the vehicle), a state in which a reinforcing panel is also removed from the structure shown in FIG. 5.

A vehicle body structure 100 according to an embodiment of the present invention will be described below with reference to FIGS. 1 to 6. The rear structure of a four-wheel passenger car is exemplified. FIG. 1 is a view showing the vehicle body structure 100 according to the embodiment of the present invention when viewed from below. FIG. 2 is an enlarged view showing a region A in FIG. 1. FIG. 3 is a sectional view taken along a line B-B in FIG. 2 and showing the vehicle body structure 100. FIG. 4 is a view showing the vehicle body structure 100 when viewed from above (the inside of the vehicle). FIG. 5 is a view showing, when viewed from above (the inside of the vehicle), a state in which a floor panel 32 is removed from the structure shown in FIG. 4. FIG. 6 is a view showing, when viewed from above (the inside of the vehicle), a state in which a reinforcing panel 34 is also removed from the structure shown in FIG. 5. Throughout the drawings, an arrow FR indicates the longitudinal direction of a vehicle body (vehicle) and FT and RR respectively indicate front and rear sides. An arrow W indicates a vehicle width direction and LT and RT respectively indicate left and right sides when viewed from the advancing direction of the vehicle body. An arrow H indicates a vertical direction and UR and LR respectively indicate upper and lower sides.

As shown in FIG. 1, the vehicle body structure 100 according to the embodiment includes left and right side sills 10L and 10R that are arranged on both sides, in the vehicle width direction, of the central portion in the longitudinal direction of the vehicle body and extend in the longitudinal direction of the vehicle body, left and right suspensions 20L and 20R that respectively suspend left and right rear wheels 50L and 50R, and a floor portion 30 that is arranged between the left and right side sills 10L and 10R and forms the lower surface of a cabin.

The left suspension 20L includes a first arm member 21L and a second arm member 22L each provided under the floor portion 30. The first arm member 21L has one end portion $21L_1$ (vehicle body side end portion) axially supported by a left connecting portion 11L that connects the left side sill 10L and a left floor frame 31L (to be described later), and the other end portion supported by a knuckle (not shown) that axially supports the wheel (left rear wheel 50L). On the other hand, the second arm member 22L has one end portion $22L_1$ (vehicle body side end portion) axially supported by the floor portion 30 (more particularly, an attachment panel 33), and the other end portion supported by the knuckle that axially supports the wheel (left rear wheel 50L). The second arm member 22L is provided with a spring receiving portion $22L_2$ in which a coil spring is provided. The left rear wheel 50L is suspended by the left suspension 20L with the above arrangement including the first arm member 21L and the second arm member 22L.

The right suspension 20R has the same arrangement as that of the left suspension 20L, and includes a first arm member 21R and a second arm member 22R each provided under the floor portion 30. The first arm member 21R has one end portion $21R_1$ (vehicle body side end portion) axially supported by a right connecting portion 11R that connects the right side sill 10R and a right floor frame 31R (to be described later), and the other end portion supported by a knuckle (not shown) that axially supports the wheel (right rear wheel 50R). On the other hand, the second arm member 22R has one end portion $22R_1$ (vehicle body side end portion) axially supported by the floor portion 30 (more particularly, the attachment panel 33), and the other end portion supported by the knuckle that axially supports the wheel (right rear wheel 50R). The second arm member 22R is provided with a spring receiving portion $22R_2$ in which a coil spring is provided. The right rear wheel 50R is suspended by the right suspension 20R with the above arrangement including the first arm member 21R and the second arm member 22R.

The floor portion 30 includes the left and right (pair of) floor frames 31L and 31R, a floor panel 32 that partitions the inside and outside of the cabin, the suspension attachment panel 33, and a seat attachment reinforcing panel 34. The left and right floor frames 31L and 31R are spaced apart from each other in the vehicle width direction and arranged between the left and right side sills 10L and 10R while extending in the longitudinal direction of the vehicle body to support the floor panel 32.

The floor panel 32 is continuously provided between the left and right side sills 10L and 10R and between the left and right floor frames 31L and 31R, thereby forming the lower surface (floor) of the cabin. The floor panel 32 according to this embodiment is formed by a plurality of panels but may be formed by one panel. As shown in FIGS. 3 and 4, a cross member 35 that connects the left and right floor frames 31L and 31R is provided on the floor panel 32 to reinforce the floor panel 32. Furthermore, a protruded portion 32A that protrudes toward the upper side of the vehicle body is formed in a portion of the floor panel 32. The protruded portion 32A extends in the vehicle width direction to connect the left and right floor frames 31L and 31R, and a seat fixing member 40 for fixing (attaching) a seat S (rear seat) is provided on the protruded portion 32A. On the other hand, the suspension attachment panel 33 to which the vehicle body side end portions $22L_1$ and $22R_1$ of the second arm members 22L and 22R of the left and right suspensions 20L and 20R are attached is provided on the inner side (lower surface side) of the protruded portion 32A.

As shown in FIGS. 1 to 3, the suspension attachment panel 33 (to be simply referred to as the "attachment panel 33" hereinafter) has a curved cross section, and includes an outer frame portion 33a that extends in the vehicle width direction to connect the left and right floor frames 31L and 31R and convex portions 33b that protrude toward the upper side of the vehicle body at the center of the bottom surface. The outer frame portion 33a is joined to the inside of the protruded portion 32A of the floor panel 32 by a front joint portion 36F and a rear joint portion 36R separated from each other in the longitudinal direction of the vehicle body. The convex portions 33b are formed in openings formed at the center of the bottom surface of the outer frame portion 33a (in portions where a left attachment portion 37L and a right attachment portion 37R are provided), and the vehicle body side end portions $22L_1$ and $22R_1$ of the second arm members 22L and 22R of the suspensions 20L or 20R are inserted from below into the convex portions 33b. In this embodiment, the outer frame portion 33a and the convex portion 33b are individually manufactured by, for example, press molding, and then joined to each other, thereby forming the attachment panel 33 by the two members. The present invention, however, is not limited to this. The outer frame portion 33a and the convex portion 33b may be manufactured as one member to form the attachment panel 33.

As shown in FIG. 2, the attachment panel 33 is provided with the left attachment portion 37L for attaching the vehicle body side end portion $22L_1$ of the second arm member 22L of the left suspension 20L to the attachment panel 33. More specifically, the left attachment portion 37L includes an axis member $37L_3$ that extends through the cylindrical vehicle body side end portion $22L_1$ to rotatably, axially support the second arm member 22L. The axis member $37L_3$ is fixed to (supported by) the attachment panel 33 at two supporting points $37L_1$ and $37L_2$ spaced apart from each other in the longitudinal direction of the vehicle body to sandwich the vehicle body side end portion $22L_1$ (convex portion 33b). This attaches the left suspension 20L (second arm member 22L) to the attachment panel 33. Similarly, the attachment panel 33 is provided with the right attachment portion 37R for attaching the vehicle body side end portion $22R_1$ of the second arm member 22R of the right suspension 20R to the attachment panel 33. More specifically, the right attachment portion 37R includes an axis member $37R_3$ that extends through the cylindrical vehicle body side end portion $22R_1$ to rotatably, axially support the second arm member 22R. The axis member $37R_3$ is fixed to (supported by) the attachment panel 33 at two supporting points $37R_1$ and $37R_2$ spaced apart from each other in the longitudinal direction of the vehicle body to sandwich the vehicle body side end portion $22R_1$ (convex portion 33b). This attaches the right suspension 20R (second arm member 22R) to the attachment panel 33.

As shown in FIG. 3, the seat attachment reinforcing panel 34 (to be simply referred to as the "reinforcing panel 34" hereinafter) is provided between the floor panel 32 and the attachment panel 33 in the vertical direction of the vehicle body in order to reinforce a portion (protruded portion 32A) of the floor panel 32, to which the seat S is attached. While being sandwiched between the floor panel 32 and the attachment panel 33, the reinforcing panel 34 is joined to the floor panel 32 in each of the front joint portion 36F and the rear joint portion 36R where the attachment panel 33 (outer frame portion 33a) and the floor panel 32 (protruded portion 32A) are joined. The reinforcing panel 34 is also joined to the distal ends of the convex portions 33b of the attachment panel 33. The reinforcing panel 34 includes, at the position of the floor panel 32 at which the seat fixing member 40 is arranged, a contact portion 34a that protrudes toward the upper side of the vehicle body and contacts the floor panel 32. The contact portion 34a is provided with a weld nut, and the seat fixing member 40 is fixed by a bolt via the floor panel 32. In this embodiment, the attachment portions 37L and 37R and the seat fixing member 40 are connected via the reinforcing panel 34 formed by a metal plate. The present invention, however, is not limited to this structure. For example, a structure in which collar nuts extend in the vertical direction and the second arm members 22L and 22R are fastened on the lower sides of the collar nuts and the seat S (seat fixing member 40) is fastened on the upper sides of the collar nuts may be adopted.

In this vehicle body structure 100, vibrations tend to be readily transferred from the rear wheels 50L and 50R to the vehicle body via the attachment portions 37L and 37R where the left and right suspensions 20L and 20R (the vehicle body side end portions of the second arm members 22L and 22R) are attached to the attachment panel 33 (vehicle body). To cope with this, the vehicle body structure 100 according to this embodiment is provided with the seat fixing member 40 between the left attachment portion 37L and the right attachment portion 37R in the vehicle width direction. Furthermore, in the longitudinal direction of the vehicle body, the seat fixing member 40 is provided between the front joint portion 36F and the rear joint portion 36R where the attachment panel 33 is joined to the floor panel 32. More preferably, in the longitudinal direction of the vehicle body and the vehicle width direction (in a planar view), the seat fixing member 40 is provided in a region (inside a region 41 shown in FIG. 2) between the two supporting points $37L_1$ and $37L_2$ of the attachment panel 33 at which the axis member 37L₃ of the left attachment portion 37L is supported and the two supporting points 37R₁ and 37R₂ of the attachment panel 33 at which the axis member 37R₃ of the right attachment portion 37R is supported.

By providing the seat fixing member 40 in this way, it is possible to press, by the weight of the seat S (rear seat), the portion of the floor portion 30 (attachment panel 33) that greatly moves vertically due to vibrations transferred from the left and right rear wheels 50L and 50R via the left and right suspensions 20L and 20R, thereby efficiently reducing the vibrations of the floor portion 30 of the vehicle body.

Summary of Embodiment

1. There is provided a vehicle body structure according to the embodiment, comprising a left suspension and a right suspension (for example, 20L, 20R) each including an arm member (for example, 22L, 22R) provided under a floor portion (for example, 30) of a vehicle body, a left attachment portion (for example, 37L) configured to attach a vehicle body side end portion (for example, 22L₁) of the arm member of the left suspension to the floor portion, a right attachment portion (for example, 37R) configured to attach a vehicle body side end portion (for example, 22R₁) of the arm member of the right suspension to the floor portion, and a seat fixing portion (for example, 40) configured to fix, to the floor portion, a seat provided on the floor portion, wherein the seat fixing portion is located between the left attachment portion and the right attachment portion in a vehicle width direction.

According to the embodiment, it is possible to press, by the weight of the seat, the portion of the floor portion that greatly moves vertically due to vibrations transferred from the left and right wheels via the left and right suspensions, thereby efficiently reducing the vibrations of the floor portion of the vehicle body.

2. In the embodiment, the floor portion includes a floor panel (for example, 32) configured to partition an inside and outside of a cabin, and an attachment panel (for example, 33) joined to a lower surface of the floor panel, the seat fixing portion is provided in the floor panel, the left attachment portion and the right attachment portion are provided in the attachment panel, the attachment panel is joined to the floor panel by a front joint portion (for example, 36F) and a rear joint portion (for example, 36R) that are spaced apart from each other in a longitudinal direction of the vehicle body, and the seat fixing portion is located between the front joint portion and the rear joint portion in the longitudinal direction of the vehicle body.

According to the embodiment, it is possible to press the attachment panel by the weight of the seat in both the front joint portion and the rear joint portion where vibrations are directly transferred from the attachment panel to the floor panel, thereby reducing the vibrations of the attachment panel.

3. In the embodiment, the floor portion further includes a reinforcing panel (for example, 34) arranged between the floor panel and the attachment panel, the attachment panel includes, in each of portions where the left attachment portion and the right attachment portion are provided, a convex portion (for example, 33b) that protrudes upward, and the reinforcing panel and the convex portions are joined.

According to the embodiment, since the attachment panel and the reinforcing panel are joined even between the front joint portion and the rear joint portion, it is possible to press the attachment panel by the weight of the seat, thereby further reducing the vibrations of the attachment panel.

4. In the embodiment, the reinforcing panel is joined to the floor panel while being sandwiched between the floor panel and the attachment panel in each of the front joint portion and the rear joint portion.

According to the embodiment, since the reinforcing panel can press the attachment panel by the front joint portion and the rear joint portion, it is possible to further reduce the vibrations of the attachment panel.

5. In the embodiment, the reinforcing panel includes a contact portion (for example, 34a) that protrudes upward and contacts the lower surface of the floor panel, and the seat fixing portion is fixed to the contact portion via the floor panel.

According to the embodiment, since it is possible to efficiently transfer the weight of the seat to the attachment panel via the contact portion of the reinforcing panel, it is possible to further reduce the vibrations of the attachment panel.

6. In the embodiment, each of the left attachment portion and the right attachment portion includes an axis member (for example, 37L₃, 37R₃) configured to rotatably support the arm member, each axis member is supported by the floor portion at two supporting points spaced apart from each other in the longitudinal direction of the vehicle body, and the seat fixing portion is located in a region (for example, 41) between the two supporting points (37L₁, 37L₂) of the left attachment portion and the two supporting points (for example, 37R₁, 37R₂) of the right attachment portion in a planar view.

According to the embodiment, it is possible to press, by the weight of the seat, the portion of the floor portion that greatly moves vertically due to vibrations transferred from the left and right wheels via the left and right suspensions, thereby efficiently reducing the vibrations of the floor portion of the vehicle body.

7. In the embodiment, the floor portion includes a pair of floor frames (for example, 31L, 31R) spaced apart from each other in the vehicle width direction, and the left attachment portion and the right attachment portion are located between the pair of floor frames in the vehicle width direction.

According to the embodiment, since it is possible to make the arm members of the suspensions long, as compared with a case in which the suspensions are attached to the floor frames, it is possible to more surely support a lateral force applied to the rear wheels. In addition, since the attachment positions of the left and right suspensions can be made closer to the seat fixing member, it is possible to efficiently reduce the vibrations of the floor portion transferred via the left and right suspensions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-110237 filed on Jun. 2, 2017, which is hereby incorporated by reference herein in its entirety.

What is claimed is:

1. A vehicle body structure comprising:
    a floor panel configured to partition an inside and outside of a cabin;
    a left suspension and a right suspension each including an arm member provided under the floor panel;
    a left attachment portion configured to attach a vehicle body side end portion of the arm member of the left suspension to the floor panel;

a right attachment portion configured to attach a vehicle body side end portion of the arm member of the right suspension to the floor panel; and
a seat fixing portion configured to fix, to the floor panel, a seat provided on the floor panel,
wherein the floor panel includes a protruded portion that protrudes toward an upper side of the vehicle body and extends in a vehicle width direction,
wherein the left attachment portion and the right attachment portion are provided on an inner side of the protruded portion in a lower surface side of the floor panel, and
wherein the seat fixing portion is provided on an upper surface side of the protruded portion and located between the left attachment portion and the right attachment portion in a vehicle width direction.

2. The structure according to claim 1, further comprising
an attachment panel joined to the inner side of the protruded portion in the lower surface side of the floor panel,
wherein the left attachment portion and the right attachment portion are provided in the attachment panel,
wherein the attachment panel is joined to the floor panel by a front joint portion and a rear joint portion that are spaced apart from each other in a longitudinal direction of the vehicle body, and
wherein the seat fixing portion is located between the front joint portion and the rear joint portion in the longitudinal direction of the vehicle body.

3. The structure according to claim 2, further comprising
a reinforcing panel arranged between the floor panel and the attachment panel,
wherein the attachment panel includes, in each of portions where the left attachment portion and the right attachment portion are provided, a convex portion that protrudes upward, and
wherein the reinforcing panel and the convex portions are joined to each other.

4. The structure according to claim 3, wherein the reinforcing panel is joined to the floor panel while being sandwiched between the floor panel and the attachment panel in each of the front joint portion and the rear joint portion.

5. The structure according to claim 3, wherein
the reinforcing panel includes a contact portion that protrudes upward and contacts the lower surface of the floor panel, and
the seat fixing portion is fixed to the contact portion via the floor panel.

6. The structure according to claim 1, wherein
each of the left attachment portion and the right attachment portion includes an axis member configured to rotatably support the arm member,
each axis member is supported by the floor panel at two supporting points spaced apart from each other in the longitudinal direction of the vehicle body, and
the seat fixing portion is located in a region between the two supporting points of the left attachment portion and the two supporting points of the right attachment portion in a planar view.

7. The structure according to claim 1, further comprising
a pair of floor frames spaced apart from each other in the vehicle width direction, and
wherein the left attachment portion and the right attachment portion are located between the pair of floor frames in the vehicle width direction.

8. The structure according to claim 1, further comprising an attachment panel joined to the inner side of the protruded portion in the lower surface side of the floor panel, and a reinforcing panel arranged between the floor panel and the attachment panel,
wherein the attachment panel includes, in each of portions where the left attachment portion and the right attachment portion are provided, a convex portion that protrudes upward, and
wherein the reinforcing panel and the convex portions are joined to each other.

* * * * *